(12) United States Patent
Fukawatase et al.

(10) Patent No.: US 8,146,943 B2
(45) Date of Patent: Apr. 3, 2012

(54) KNEE AIRBAG DEVICE FOR VEHICLE

(75) Inventors: Osamu Fukawatase, Aichi (JP); Yasushi Itou, Toyota (JP); Tomoko Kurata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/061,556

(22) PCT Filed: Dec. 22, 2008

(86) PCT No.: PCT/JP2008/073291
§ 371 (c)(1),
(2), (4) Date: May 11, 2011

(87) PCT Pub. No.: WO2010/026671
PCT Pub. Date: Mar. 11, 2010

(65) Prior Publication Data
US 2011/0204603 A1    Aug. 25, 2011

(30) Foreign Application Priority Data
Sep. 2, 2008    (JP) .................................. 2008-225074

(51) Int. Cl.
*B60R 21/205*    (2006.01)
*B60R 21/239*    (2006.01)
(52) U.S. Cl. .................................... 280/739; 280/730.1
(58) Field of Classification Search .................. 280/732, 280/730.1, 739
See application file for complete search history.

(56) References Cited

U.S. PATENT DOCUMENTS 6,155,595 A    12/2000    Schultz
6,705,638 B2    3/2004    Abe et al.
(Continued)

FOREIGN PATENT DOCUMENTS

DE    42 09 604    10/1992
(Continued)

OTHER PUBLICATIONS

International Search Report in International Application No. PCT/JP2008/073291; Mailing Date: Mar. 31, 2009.

(Continued)

*Primary Examiner* — Ruth Ilan
(74) *Attorney, Agent, or Firm* — Finnegan, Henderson, Farabow, Garrett & Dunner, LLP (57) ABSTRACT

It is an object to ensure that, even when knee regions of an occupant are in a near state with respect to a storage section of a knee airbag at the time of a frontal collision of a vehicle, the knee regions can be restrained appropriately by the knee airbag.

A knee airbag 14 stored in a folded state in a glove box door 22 (a storage section) receives a supply of a gas at the time of a frontal collision of a vehicle 18 and inflates and deploys toward knee regions 36K of an occupant 36 seated in a front passenger seat 12 (a vehicle seat). At this time, when the knee regions 36K of the occupant 36 are in a near state with respect to the glove box door 22, the gas inside the knee airbag 14 becomes ventable to the outside from a vent hole 16, The vent hole 16 appropriately vents this gas from the inside, of the knee airbag 14, and the reaction force of the knee airbag 14 with respect to the knee regions 36K are reduced.

6 Claims, 5 Drawing Sheets

U.S. PATENT DOCUMENTS

| | | |
|---|---|---|
| 7,261,318 B2 | 8/2007 | Enders |
| 2003/0214124 A1 | 11/2003 | DePottey et al. |
| 2004/0051285 A1 | 3/2004 | Fischer |
| 2004/0262898 A1* | 12/2004 | Bauer et al. .................. 280/739 |
| 2005/0098986 A1 | 5/2005 | Kitagawa et al. |
| 2006/0071461 A1 | 4/2006 | Williams et al. |
| 2006/0181067 A1 | 8/2006 | Maripudi |
| 2006/0192371 A1 | 8/2006 | Abe |
| 2006/0273562 A1* | 12/2006 | Fischer et al. .............. 280/739 |
| 2007/0057492 A1* | 3/2007 | Feller et al. ............... 280/730.2 |
| 2007/0170709 A1* | 7/2007 | Braun et al. ................. 280/739 |
| 2009/0039629 A1* | 2/2009 | Hall et al. ................... 280/739 |

FOREIGN PATENT DOCUMENTS

| | | |
|---|---|---|
| DE | 101 46 493 A1 * | 4/2003 |
| GB | 2 387 152 | 10/2003 |
| JP | 11-321539 | 11/1999 |
| JP | 2002-356137 | 12/2002 |
| JP | 2004-262432 | 9/2004 |
| JP | 2005-145109 | 6/2005 |
| JP | 2005-525965 | 9/2005 |
| JP | 2006-224776 | 8/2006 |
| JP | 2006-264662 | 10/2006 |
| JP | 2007-50848 | 3/2007 |
| JP | 2007-91018 | 4/2007 |
| JP | 2007-161090 | 6/2007 |
| JP | 2008-515716 | 5/2008 |
| JP | 2008-143509 | 6/2008 |
| JP | 2008-149930 | 7/2008 |
| WO | WO 98/00313 | 1/1998 |

OTHER PUBLICATIONS

Notice of Reasons for Rejection in JP 2008-225074; Mailing Date: Apr. 27, 2010.

Applicant's 1$^{st}$ Response to Written Opinion in International Application No. PCT/JP2008/073291 (Mar. 31, 2009).

Applicant's 2$^{nd}$ Response to Written Opinion in International Application No. PCT/JP2008/073291 (Dec. 15, 2009).

Extended European Search Report for EP Appl. No. 08876877.5 dated Sep. 6, 2011.

* cited by examiner

KNEE AIRBAG DEVICE FOR VEHICLE

CROSS-REFERENCE TO RELATED APPLICATIONS

This application is a national phase application of International Application No. PCT/JP2008/073291, filed Dec. 22, 2008, and claims the priority of Japanese Application No. 2008-225074, filed Sep. 2, 2008, the contents of both of which are incorporated herein by reference.

TECHNICAL FIELD

The present invention relates to a knee airbag device for a vehicle.

BACKGROUND ART

A structure has been disclosed where, in a knee protection device for a vehicle occupant disposed in correspondence to the height position of knee regions of a seated occupant, as connecting means connecting opposing portions of walls of the airbag, partition walls are disposed in an upper region and in a lower region inside the airbag, and a gas generator (inflator) for inflating the airbag is disposed in a height position between the upper and lower partition walls (see patent document 1). Further, as a vehicle occupant protection device, a structure has been disclosed where an airbag for protecting an occupant is incorporated in a cover portion (glove box door) of a glove box (see patent document 2).

Patent Document 1: JP-A No. 11-321539
Patent Document 2: JP-A No. 2002-356137

DISCLOSURE OF THE INVENTION

<Problem that the Invention is to Solve>

The position of the knee regions of an occupant seated in a vehicle seat changes depending on the build of the occupant and the front-rear position of the vehicle seat, so that the position of the knee regions may sometimes be sufficiently distanced from, and may sometimes be near, the storage section of the knee airbag, such as the instrument panel or the glove box door.

However, in neither of the conventional examples described above is consideration given in regard to such positions of the knee regions of occupants.

In view of these circumstances, it is an object of the present invention to ensure that, even when knee regions of an occupant are in a near state with respect to a storage section of a knee airbag at the time of a frontal collision of a vehicle, the knee regions can be restrained appropriately by the knee airbag.

<Means for Solving the Problem>

A first aspect of the present invention comprises: a knee airbag that is normally stored in a folded state in a storage section and is configured to receive a supply of a gas at the time of a collision of the vehicle and inflate and deploy toward knee regions of an occupant seated in a vehicle seat; and a vent hole that is disposed in the knee airbag to vent the gas to the outside when the knee regions are in a near state with respect to the storage section of the knee airbag.

In the knee airbag device for a vehicle pertaining to the first aspect of the present invention, the knee airbag stored in a folded state in the storage section receives the supply of the gas at the time of a frontal collision of the vehicle and inflates and deploys toward the knee regions of the occupant seated in the vehicle seat. At this time, when the knee regions of the occupant are in a near state with respect to the storage section of the knee airbag, the gas inside the knee airbag becomes ventable to the outside from the vent hole, and that gas is appropriately vented, whereby the reaction force of the knee airbag with respect to the knee regions is reduced. Thus, the knee regions can be restrained appropriately by the knee airbag.

A second aspect of the present invention is the knee airbag device for a vehicle pertaining to the first aspect, wherein an airbag case, that is configured to fold and store the knee airbag and in which is disposed a through hole corresponding to the vent hole, is disposed in the storage section, and the vent hole aligns with the through hole in the airbag case when the knee regions are in a near state with respect to the storage section of the knee airbag.

In the knee airbag device for a vehicle pertaining to the second aspect of the present invention, the through hole corresponding to the vent hole in the knee airbag is disposed in the airbag case disposed in the storage section of the knee airbag, and the vent hole in the knee airbag aligns with the through hole in the airbag case when the knee regions of the occupant are in a near state with respect to the storage section of the knee airbag. Consequently, when the knee regions of the occupant are restrained by the knee airbag, the gas inside the knee airbag is vented smoothly to the outside through the vent hole in the knee airbag and the through hole in the airbag case. Thus, the reaction force of the knee airbag with respect to the knee regions is reduced, so the knee regions can be restrained appropriately by the knee airbag.

A third aspect of the present invention is the knee airbag device for a vehicle pertaining to the second aspect, wherein the vent hole is set in a position where it aligns with the through hole in the airbag case in a folded state of the knee airbag.

In the knee airbag device for a vehicle pertaining to the third aspect of the present invention, the vent hole is set in a position where it aligns with the through hole in the airbag case in a folded state of the knee airbag, so even when the knee airbag restrains the knee regions of the occupant in the initial stage of inflation and deployment of the knee airbag, the gas inside the knee airbag is vented smoothly to the outside through the vent hole in the knee airbag and the through hole in the airbag case. For this reason, in a position where there is virtually no clearance between the knee regions of the occupant and the storage section of the knee airbag, even when the knee regions are in a near state with respect to the storage section of the knee airbag, the knee regions can be restrained appropriately by the knee airbag.

A fourth aspect of the present invention is the knee airbag device for a vehicle pertaining to the first aspect, further comprises: detecting means that can detect that the knee regions are in a near state with respect to the storage section and an actuator that changes the vent hole from a closed state to an open state when the knee airbag inflates and deploys when the near state is detected by the detecting means.

In the knee airbag for a vehicle pertaining to the fourth aspect of the present invention, the fact that the knee regions of the occupant are in a near state with respect to the storage section of the knee airbag can be detected by the detecting means. When the knee airbag inflates and deploys when this near state has been detected, the actuator is actuated and the vent hole in the knee airbag changes from a closed state to an open state. Consequently, when the knee regions of the occupant are restrained by the knee airbag, the gas inside the knee airbag is vented smoothly to the outside through the vent hole. Thus, the reaction force of the knee airbag with respect to the knee regions is reduced, so the knee regions can be restrained appropriately by the knee airbag.

A fifth aspect of the present invention is the knee airbag device for a vehicle pertaining to any one of the first to fourth aspects, wherein the storage section is disposed inside a glove box door configuring an occupant-side outer wall of a glove box of the vehicle.

In the knee airbag device for a vehicle pertaining to the fifth aspect of the present invention, the storage section of the knee airbag is disposed inside the glove box door configuring the occupant-side outer wall of the glove box of the vehicle, so the knee airbag can be speedily deployed between the knee regions of the occupant and the glove box door at the time of a frontal collision of the vehicle. For this reason, restraint with respect to the knee regions of the occupant can be raised even more.

<Advantageous Effects of the Invention>

As described above, according to the knee airbag device for a vehicle pertaining to the first aspect of the present invention, there is obtained the excellent effect that, even when the knee regions of the occupant are in a near state with respect to the storage section of the knee airbag at the time of a frontal collision of the vehicle, the knee regions can be restrained appropriately by the knee airbag.

According to the knee airbag device for a vehicle pertaining to the second aspect of the present invention, there is obtained the excellent effect that, when the knee regions of the occupant are in a near state with respect to the storage section of the knee airbag, the gas inside the knee airbag can be vented smoothly to the outside through the vent hole in the knee airbag and the through hole in the airbag case, the reaction force of the knee airbag with respect to the knee regions can be reduced, and the knee regions can be restrained appropriately.

According to the knee airbag device for a vehicle pertaining to the third aspect of the present invention, there is obtained the excellent effect that, in a position where there is virtually no clearance between the knee regions of the occupant and the storage section of the knee airbag, even when the knee regions are in a near state with respect to the storage section of the knee airbag, the knee regions can be restrained appropriately by the knee airbag.

According to the knee airbag device for a vehicle pertaining to the fourth aspect of the present invention, there is obtained the excellent effect that, even when the knee regions of the occupant are in a near state with respect to the storage section of the knee airbag, the reaction force of the knee airbag with respect to the knee regions can be reduced and the knee regions can be restrained appropriately by opening, with the actuator, the vent hole in the knee airbag.

According to the knee airbag device for a vehicle pertaining to the fifth aspect of the present invention, there is obtained the excellent effect that restraint with respect to the knee regions of the occupant can be raised even more.

BRIEF DESCRIPTION OF THE DRAWINGS

FIG. 1 to FIG. 3 pertain to a first embodiment.

FIG. 4 and FIG. 5 pertain to a second embodiment.

DESCRIPTION OF EMBODIMENTS

Figure 1:
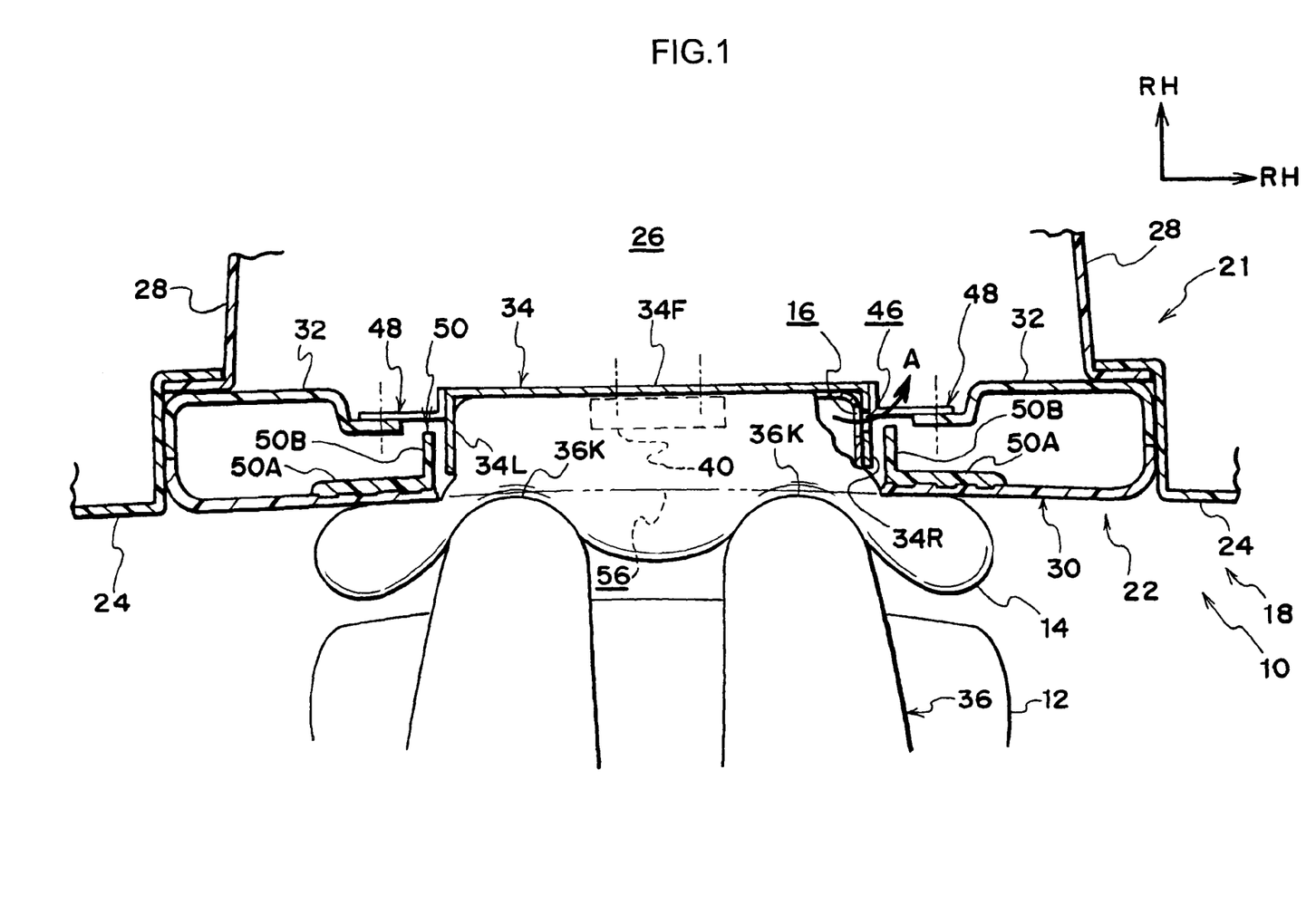
FIG. 1 is a transverse sectional view showing a state where, when knee regions of an occupant are in a near state with respect to a glove box door at the time of a frontal collision of a vehicle, a gas inside a knee airbag is vented to the outside through a vent hole in the knee airbag and a through hole in an airbag case and the knee regions are restrained by the knee airbag in a state where the reaction force with respect to the knee regions is reduced.
Figure 2:
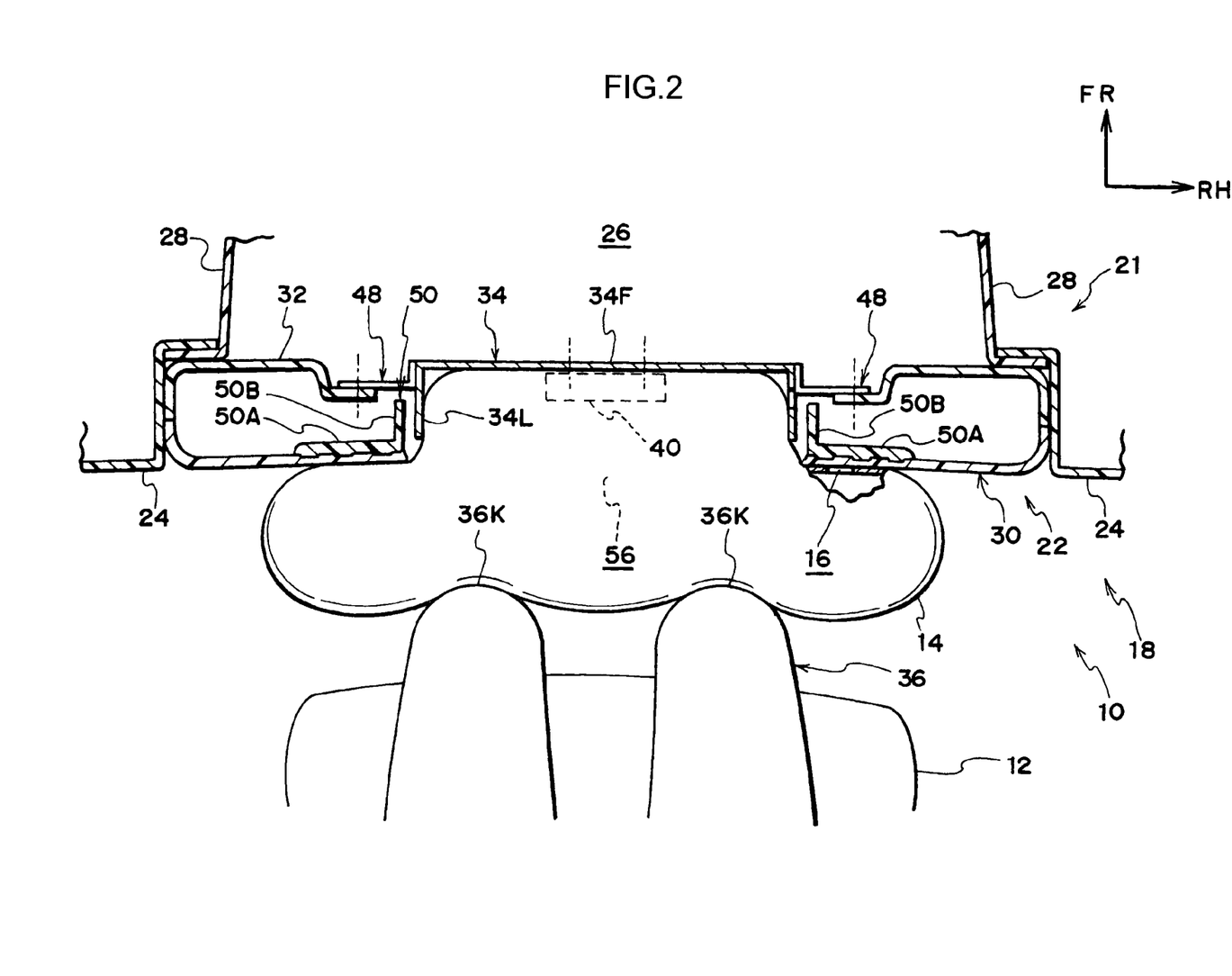
FIG. 2 is a transverse sectional view showing a state where, when the knee regions of the occupant are not in the near state with respect to the glove box door, the vent hole is blocked by an outer panel of the glove box door and the knee regions are restrained by the knee airbag in a state where the reaction force with respect to the knee regions is sufficiently ensured.
Figure 3:
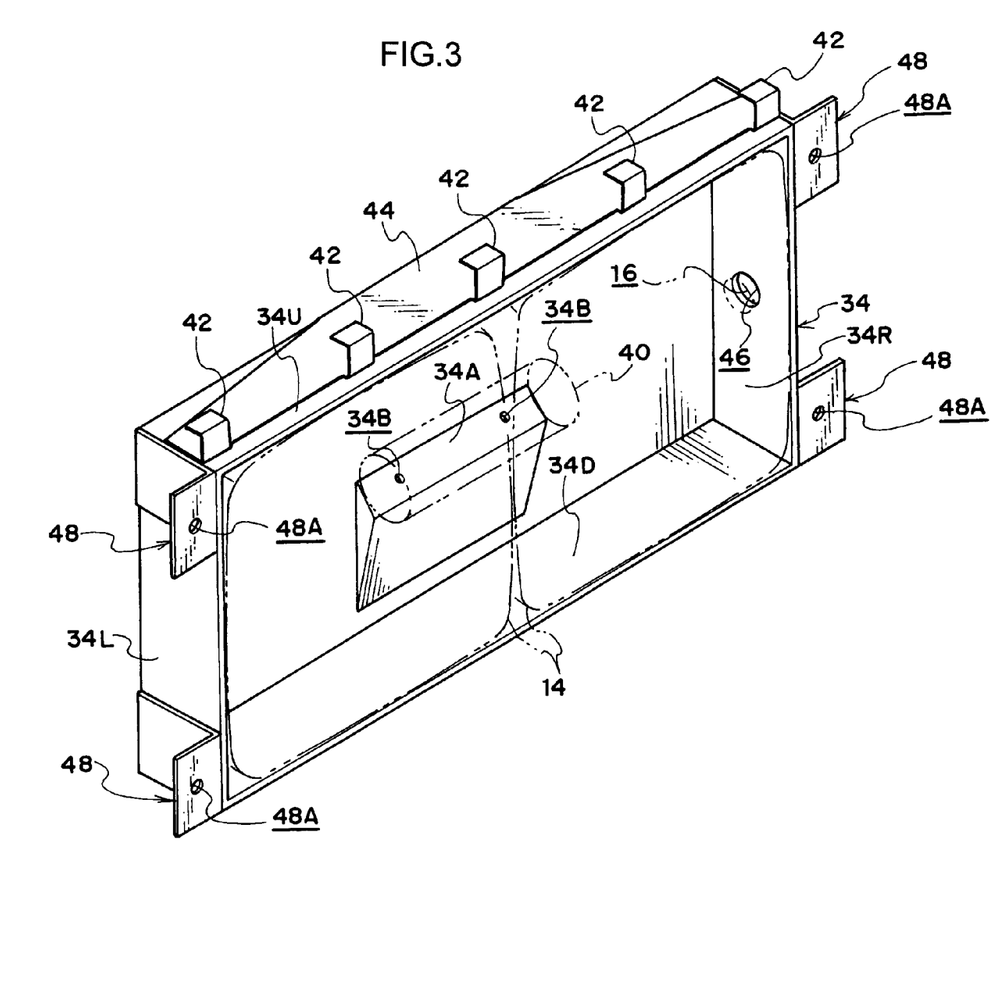
FIG. 3 is a perspective view showing the airbag case, the knee airbag, and an inflator.
Figure 4:
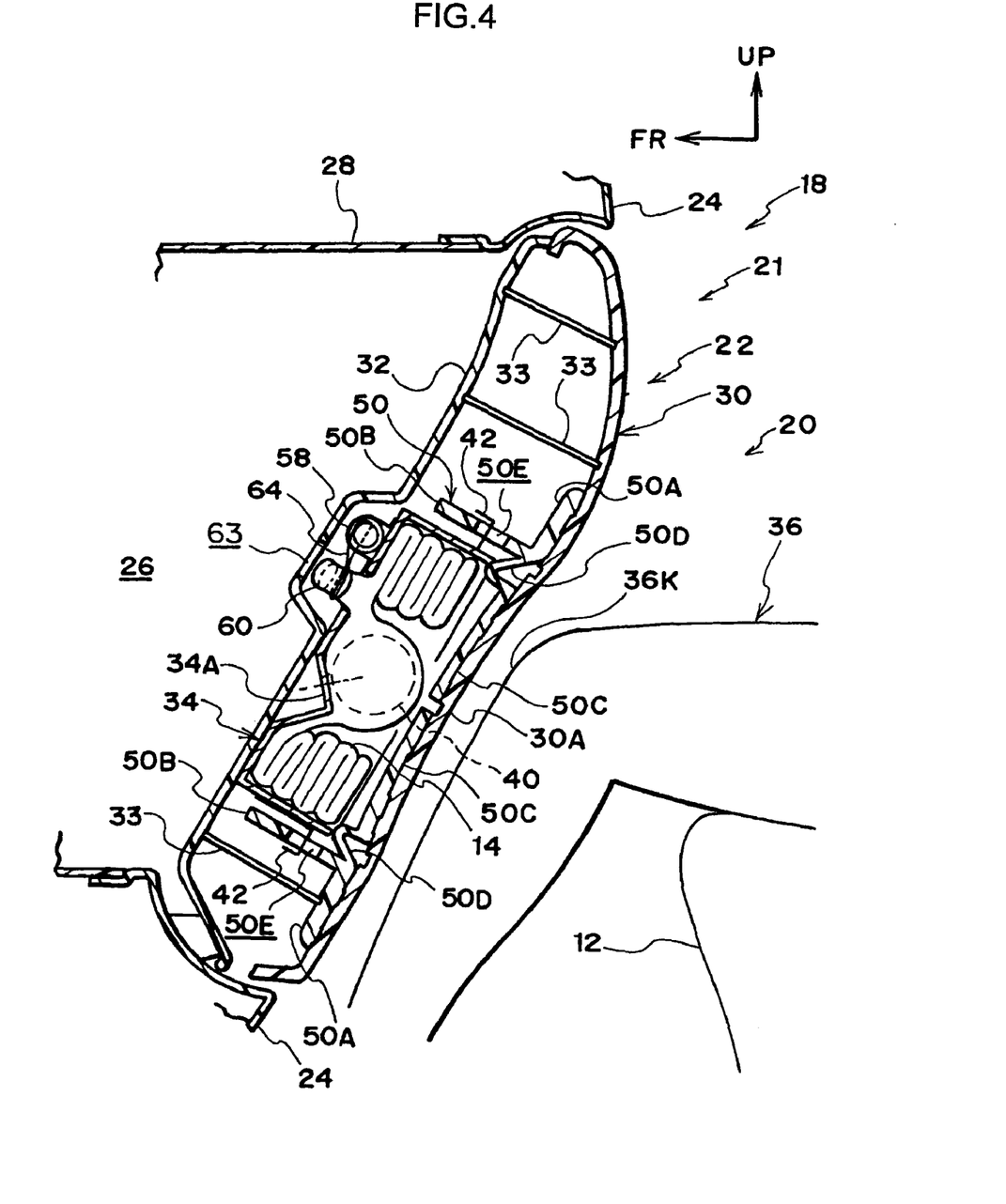
FIG. 4 is a longitudinal sectional view showing a knee airbag device for a vehicle.
Figure 5:
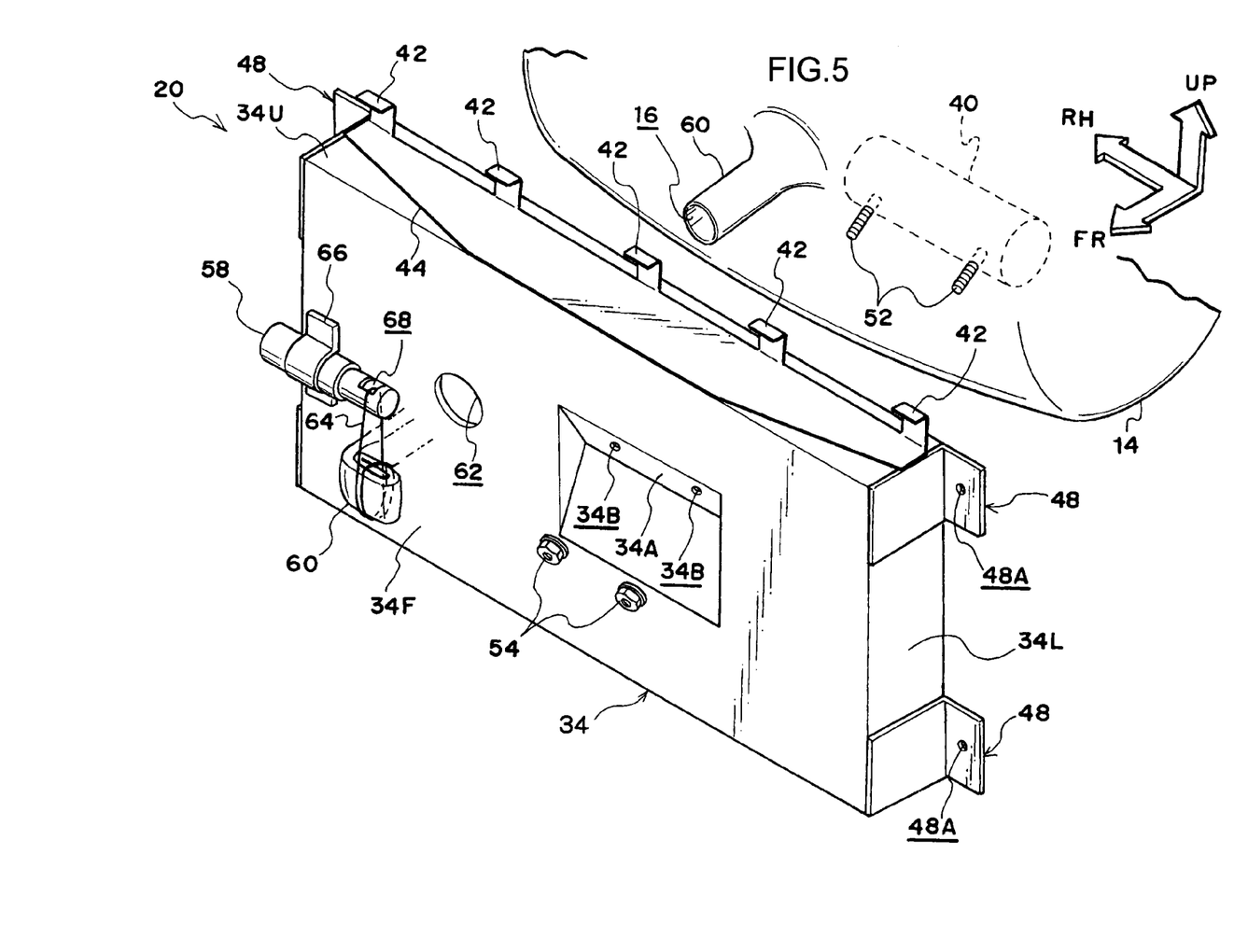
FIG. 5 is an exploded perspective view showing the knee airbag device for a vehicle.

Embodiments of the present invention will be described below on the basis of the drawings. FIG. 1 to FIG. 3 are drawings pertaining to a first embodiment, and FIG. 4 and FIG. 5 are drawings pertaining to a second embodiment, but reference will also appropriately be made to FIG. 4 and FIG. 5 in the description of the first embodiment.

First Embodiment

In FIG. 1, a knee airbag device for a vehicle 10 pertaining to the present embodiment is a knee airbag device disposed in correspondence to a front passenger seat 12, which is one example of a vehicle seat, and the knee airbag device for a vehicle 10 has a knee airbag 14 and a vent hole 16.

The knee airbag 14 is normally stored in a folded state inside a glove box door 22, for example, that is a storage section, and the knee airbag 14 is configured to receive a supply of a gas from an inflator 40, for example, at the time of a collision of a vehicle 18 and inflate and deploy toward knee regions 36K of an occupant 36 seated in the front passenger seat 12.

The vent hole 16 is a through hole with a circular shape, for example, disposed in the side portion on the vehicle right side, for example, of the knee airbag 14 and is configured to vent, to the outside of the knee airbag 14, the gas that has been supplied to the inside of the knee airbag 14 from the inflator 40 when the knee regions 36K of the occupant 36 are in a near state with respect to the storage section of the knee airbag 14, that is, the glove box door 22. Here, "near state" means that the clearance between the glove box door 22 that is the storage section of the knee airbag 14 and the knee regions 36K of the occupant 36 is smaller than the thickness of the knee airbag 14 at the time of complete inflation and deployment. In other words, a positional relationship where the knee regions 36K of the occupant 36 end up touching the knee airbag 14 before the knee airbag 14 is completely inflated and deployed to its inherent size will be called a near state.

Briefly describing now the configuration of a glove box 21, in FIG. 1 and FIG. 2, the glove box 21 is incorporated and fixed in a position on the vehicle front side of the front passenger seat 12 of an instrument panel 24 on the front passenger seat 12 side. This glove box 21 is, for example, configured to include a body 28, which configures a storage space 26, and the glove box door 22, which configures an occupant-side outer wall. The body 28 is, for example, configured as a box that opens toward the vehicle rear side.

The glove box door 22 is a cover that combines an outer panel 30, which is positioned on the occupant side (vehicle rear side) at the time when the glove box door 22 is closed, and an inner panel 32, which is positioned on the opposite side of the occupant (vehicle front side), and inside of which a storage space for the knee airbag 14 is ensured. As shown in FIG. 4, plural ribs 33 for reinforcement are disposed between the outer panel 30 and the inner panel 32 inside the glove box door 22. Studs (not shown) are disposed on both vehicle width direction sides of the lower end portion of the glove box door 22, and the glove box door 22 is assembled to the instrument panel 24 side via the studs. Further, the glove box door 22 is configured to be opened and closed using these studs as a center of rotation.

In FIG. 1, an airbag case 34, that can fold and store the knee airbag 14 is disposed inside the glove box door 22 that is the storage section. As shown in FIG. 3, the airbag case 34 is a box made of metal having an upper wall portion 34U, a front wall portion 34F, a lower wall portion 34D, a side wall portion 34R on the vehicle right side, and a side wall portion 34L on the vehicle left side, and the airbag case 34 is placed such that its vehicle rear side becomes an open side at a time when the glove box door 22 is closed (see FIG. 4). Metal plates 44, for example, are fixedly attached to the top surface of the upper wall portion 34U and to the undersurface of the lower wall portion 34D of the airbag case 34. Plural hooks 42 are disposed in-line in the vehicle width direction on these metal plates 44.

As shown in FIG. 4, a second airbag case 50 is mounted on the outer panel 30 side of the inside of the glove box door 22. As shown in FIG. 1 and FIG. 4, this second airbag case 50 is, for example, fixedly attached to the inner surface (surface on the vehicle front side) of the outer panel 30 at upper, lower, left, and right base portions 50A. On the base portions 50A, vertical wall portions 50B are disposed upright in a frame-like manner toward the inner panel 32 so as to surround the mounting region of the airbag case 34.

As shown in FIG. 4, an upper and lower pair of door base members 50C, for example, is disposed along the inner surface of the outer panel 30 between the upper and lower vertical wall portions 50B. A tear line (not shown) that can break when subjected to an inflation pressure of the knee airbag 14 equal to or greater than a predetermined value is formed between this upper and lower pair of door base members 50C. Further, hinge portions 50D extending in the vehicle width direction are formed on the base portions of the upper and lower pair of vertical wall portions 50B. The door base members 50C are configured such that they can deploy toward both the vehicle up side and the vehicle down side about the hinge portions 50D after the tear line has broken because of the inflation pressure of the knee air bag 14. A tear line 30A is also disposed on the outer panel 30 in correspondence to the tear line of the door base members 50C. The outer panel 30 is configured to break at the tear line 30A in accompaniment with the deployment of the upper and lower pair of door base members 50C, so that part of the outer panel 30 deploys toward both the vehicle up side and the vehicle down side together with the door base members 50C.

Plural locking holes 50E are formed in-line along the vehicle width direction in the upper and lower vertical wall portions 50B of the second airbag case 50, and the hooks 42 of the airbag case 34 are locked in the locking holes 50E.

Mounting brackets 48 that are L-shaped, for example, are fixedly attached two each to the right side surface of the side wall portion 34R on the vehicle right side of the airbag case 34 and to the left side surface of the side wall portion 34L on the vehicle left side of the airbag case 34. Through holes 48A are formed in these mounting brackets 48. When the airbag case 34 is assembled to the glove box door 22, the hooks 42 of the airbag case 34 are locked in the locking holes 50E in the vertical wall portions 50B of the second airbag case 50 as shown in FIG. 4, and then screws (not shown) are passed through the through holes 48A in the mounting brackets 48 and fastened to the outer surface (surface on the vehicle front side) of the inner panel 32 as shown in FIG. 1.

As shown in FIG. 3, a through hole 46 corresponding to the vent hole 16 in the knee airbag 14 is disposed in the side wall portion 34R on the vehicle right side, for example, of the airbag case 34. The vent hole 16 in the knee airbag 14 is placed so as to align with the through hole 46 in the airbag case 34 when the knee regions 36K of the occupant 36 are in a near state with respect to the glove box door 22 that is the storage section of the knee airbag 14. Specifically, the vent hole 16 is set in a position where it aligns with the through hole 46 in the airbag case 34 in a folded state of the knee airbag 14.

In FIG. 1 to FIG. 3, the inflator 40 is placed inside the knee airbag 14 and is configured to blow out and supply the gas to the inside of the knee airbag 14 at the time of a collision of the vehicle 18. Specifically, the inflator 40 is connected to an airbag ECU (not shown) via a wire harness (not shown) and is configured such that it is actuated by an actuating current from the airbag ECU supplies the gas for inflation with respect to the knee airbag 14. The airbag ECU is configured to supply the actuating current with respect to the inflator 40 when it has determined a frontal collision of the vehicle by a signal from a collision sensor (not shown).

As shown in FIG. 5, two stud bolts 52, for example, are disposed upright on the inflator 40, and the inflator 40 is fixed to the airbag case 34 together with the knee airbag 14 by inserting the stud bolts 52 from the vehicle rear side into a mounting portion 34A of the airbag case 34 and fastening nuts 54 from the vehicle front side with respect to the stud bolts 52. As shown in FIG. 4, the mounting portion 34A of the airbag case 34 is configured as an inclined surface inclined away from the inner panel 32 of the glove box door 22 in order to ensure mounting space for nuts 54. Further, as shown in FIG. 3, through holes 34B in two places for passing the stud bolts 52 therethrough are disposed in the mounting portion 34A of the airbag case 34.

(Action)

The present embodiment is configured as described above, and its action will be described below. In FIG. 1, in the knee airbag device for a vehicle 10 pertaining to the present embodiment, when the vehicle 18 experiences a frontal collision and the airbag ECU determines the occurrence of the collision on the basis of the signal from the unillustrated collision sensor, the actuating current is supplied from the airbag ECU to the inflator 40. The inflator 40 receives the actuating current, is actuated, and blows out a large amount of the gas. This gas is supplied to the knee airbag 14 stored in a folded state inside the glove box door 22 that is the storage section, whereby the knee airbag 14 begins to inflate and deploy.

At this time, the inflation pressure of the knee airbag 14 acts on the back sides of the door base members 50C (see FIG. 4) positioned on the outer panel 30 side of the knee airbag 14 inside the glove box door 22. When this inflation pressure becomes equal to or greater than the predetermined value, the door base members 50C break along the tear line (not shown). Further, in accompaniment with this, the tear line 30A of the outer panel 30 also breaks. Thus, the door base members 50C and part of the outer panel 30 become an airbag door and deploy toward both the vehicle up side and the vehicle down side about the hinge portions 50D, and an open portion 56 is formed in the outer panel 30. The knee airbag 14 swells out through this open portion 56 from the inside of the glove box door 22 toward the knee regions 36K of the occupant 36.

Here, first, the action when the knee regions 36K of the occupant 36 are in a near state with respect to the glove box door 22 will be described. In the present embodiment, the through hole 46 corresponding to the vent hole 16 in the knee airbag 14 is disposed in the airbag case 34 disposed in the storage section of the knee airbag 14, that is, the glove box door 22, and the vent hole 16 aligns with the through hole 46 in the airbag case 34 when the knee regions 36K of the occupant 36 are in a near state with respect to the glove box door 22.

Consequently, at the time of restraint of the knee regions 36K by the knee airbag 14, the gas inside the knee airbag 14 is vented smoothly in the direction of arrow A to the outside appropriately through the vent hole 16 in the knee airbag 14 and the through hole 46 in the airbag case 34. Thus, a rise in the internal pressure of the knee airbag 14 is suppressed and the reaction force of the knee airbag 14 with respect to the knee regions 36K is reduced, so the knee regions 36K in the near state can be restrained appropriately by the knee airbag 14.

Further, in the present embodiment, the vent hole 16 is set in a position where it aligns with the through hole 46 in the airbag case 34 in a folded state of the knee airbag 14, so even when the knee airbag 14 restrains the knee regions 36K of the occupant 36 in the initial stage of inflation and deployment of the knee airbag 14, the gas inside the knee airbag 14 is vented smoothly to the outside appropriately through the vent hole 16 in the knee airbag 14 and the through hole 46 in the airbag case 34. For this reason, in a position where there is virtually no clearance between the knee regions 36K of the occupant 36 and the storage section of the knee airbag 14, even when the knee regions 36K are in a near state with respect to the glove box door 22, the knee regions 36K can be restrained appropriately by the knee airbag 14.

Moreover, in the knee airbag device for a vehicle 10 pertaining to the present embodiment, the knee airbag 14 is folded and stored inside the glove box door 22 configuring the occupant-side outer wall of the glove box 21 of the vehicle 18, so the knee airbag 14 can be speedily deployed between the knee regions 36K of the occupant 36 and the glove box door 22 at the time of a frontal collision of the vehicle 18. For this reason, restraint with respect to the knee regions 36K of the occupant 36 can be raised even more.

Next, in FIG. 2, the action when the knee regions 36K of the occupant 36 are not in the near state with respect to the glove box door 22, that is, when the clearance between the glove box door 22 and the knee regions 36K of the occupant 36 is equal to or greater than the thickness of the knee airbag 14 at the time of complete inflation and deployment, will be described. In this case, the clearance between the glove box door 22 and the knee regions 36K is sufficiently ensured, so at the time of a frontal collision of the vehicle 18, the knee airbag 14 can inflate and deploy to its inherent size and restrain the knee regions 36K of the occupant 36. At this time, the vent hole 16 in the knee airbag 14 moves to the outside of the glove box door 22 in accompaniment with inflation and deployment of the knee airbag 14 and is pressed against and blocked by the outer surface (surface on the vehicle rear side) of the outer panel 30 of the glove box door 22 at the time of restraint of the knee regions 36K of the occupant 36. Thus, venting of the gas from the vent hole 16 is suppressed, so a drop in the internal pressure of the knee airbag 14 at the time of restraint of the knee regions 36K is suppressed and the reaction force of the knee airbag 14 with respect to the knee regions 36K is sufficiently ensured. In this manner, the knee regions 36K can be restrained appropriately by the knee airbag 14.

The shape of the vent hole 16 is not limited to being circular, and the vent hole 16 may also, for example, be an elongated hole that is long in the vehicle front-rear direction. When the vent hole 16 is made into the elongated hole, the vent hole 16 can be aligned for a longer amount of time with the through hole 46 in the airbag case 34 in the process of the knee airbag 14 inflating and deploying from its folded state toward the knee regions 36K of the occupant 36 at the time of inflation and deployment of the knee airbag 14. That is, this can accommodate a wider range, from a case where there is virtually no clearance between the glove box door 22 and the knee regions 36K to a case where there is a certain degree of clearance. Even when the vent hole 16 is a long hole, the vent hole 16 is set so as to move away from the through hole 46 in the airbag case 34 when the clearance between the glove box door 22 and the knee regions 36K is sufficiently ensured and the knee airbag 14 has inflated and deployed to its inherent size.

Further, in the present embodiment, the vent hole 16 is disposed in the side portion on the vehicle right side of the knee airbag 14, but the placement and number of the vent hole 16 are not limited to the above description and example shown in the drawings. Further, the configurations around the knee airbag device for a vehicle 10, such as the glove box door 22 and the airbag case 34, are not limited to the example shown in the drawings. Moreover, the front passenger seat 12 is cited as one example of the vehicle seat and the knee airbag device for a vehicle 10 is a knee airbag device disposed in correspondence to the front passenger seat, but the present invention is not limited to this and can also, for example, be applied to a knee airbag device for the driver's seat.

Second Embodiment

In FIG. 4 and FIG. 5, a knee airbag device for a vehicle 20 pertaining to the present embodiment has a seat slide sensor (not shown), which is one example of detecting means, and an actuator 58.

The seat slide sensor is configured to detect that the knee regions 36K of the occupant 36 are in a near state with respect to the glove box door 22 that is the storage section, and the seat slide sensor is, for example, disposed on a seat rail portion (not shown) that enables the front-rear position of the front passenger seat 12 to be adjusted. The determination of whether or not the knee regions 36K are in a near state with respect to the glove box door 22 is determined by an ECU (not shown) on the basis of a signal from this seat slide sensor. To cite one example, when the front-rear position of the front passenger seat 12 is adjusted to its most-forward position, for example, it is determined that the knee regions 36K are in a near state with respect to the glove box door 22. This near state determination criterion is appropriately changed as needed. For example, a case where the front-rear position of the front passenger seat 12 is in a predetermined range including its most-forward position may also be determined as a near state.

The actuator 58 is configured to change the vent hole 16 from a closed state to an open state when the knee airbag 14 inflates and deploys when the near state of the knee regions 36K of the occupant 36 with respect to the glove box door 22 has been detected by the seat slide sensor.

In the present embodiment, as shown in FIG. 5, the vent hole 16 in the knee airbag 14 is disposed in a distal end of a duct portion 60 extending toward the vehicle front side. This duct portion 60 is normally passed toward the vehicle front side from a through hole 62 disposed in the front wall portion 34F of the airbag case 34 and is folded so as to block the vent hole 16. The duct portion 60 in its folded state is bound and held by a strap 64, for example.

The actuator 58 is fixed, using a mounting bracket 66, to the surface on the vehicle front side of the front wall portion 34F of the airbag case 34. The fixed position of the actuator 58 is in the neighborhood of the through hole 62, for example. The actuator 58 has a substantially cylindrical casing, and a hole portion 68 that opens in the vehicle vertical direction is disposed in one end thereof. The strap 64 binding the duct portion 60 of the knee airbag 14 is passed through the hole portion 68.

Inside the casing of the actuator 58 are disposed a micro gas generator (not shown) that can generate a relatively small quantity of gas at the time of actuation and a cutter (not shown) that moves inside the casing because of the pressure of that gas. In FIG. 5, the cutter is normally positioned on the vehicle right side of the hole portion 68, and when the pressure of the gas acts on the cutter because of the actuation of the micro gas generator, the cutter is instantaneously pressed out and moves toward the vehicle left side to the position of the hole portion 68. At this time, the strap 64 is severed by a shearing force arising between the cutter and the edge portion of the hole portion 68.

As shown in FIG. 4, part of the inner panel 32 of the glove box door 22 is formed such that it swells out in a convex shape toward the vehicle front side in order to fit the duct portion 60 and the actuator 58 inside the glove box door 22, and the through hole 63, which is for ensuring that the duct portion 60 can extend out toward the vehicle front side of the inner panel 32 when the strap 64 has been severed, is disposed in a site thereof corresponding to the duct portion 60.

Regarding other portions, these are the same as in the first embodiment, so identical reference signs are given to identical portions in the drawings and description will be omitted.
(Action)

The present embodiment is configured as described above, and its action will be described below. In FIG. 4 and FIG. 5, in the knee airbag device for a vehicle 20 pertaining to the present embodiment, when the vehicle 18 experiences a frontal collision, like in the first embodiment, the knee airbag 14 receives the supply of the gas from the inflator 40 and inflates and deploys toward the knee regions 36K of the occupant 36.

Here, when the fact that the knee regions 36K of the occupant 36 are in a near state with respect to the glove box door 22 is detected by the seat slide sensor, the actuator 58 is actuated at the same timing as the actuation of the inflator 40, for example, and the strap 64 binding the duct portion 60 of the knee airbag 14 is severed. Thus, the duct portion 60 is freed and the vent hole 16 changes from a closed state to an open state. Consequently, when the knee regions 36K of the occupant 36 are restrained by the knee airbag 14, the gas inside the knee airbag 14 is vented smoothly to the outside through the vent hole 16. Thus, the reaction force of the knee airbag 14 with respect to the knee regions 36K is reduced, so the knee regions 36K in the near state can be restrained appropriately by the knee airbag 14. The duct portion 60 extends out toward the vehicle front side of the inner panel 32 through the through hole 62, so the gas inside the knee airbag 14 is vented into the inside of the storage space 26 in the glove box 21.

On the other hand, when the fact that the knee regions 36K of the occupant 36 are not near the glove box door 22 is detected by the seat slide sensor, the actuator 58 is not actuated and the strap 64 is not severed, so the closed state of the vent hole 16 is maintained. Consequently, the knee airbag 14 can inflate and deploy to its inherent size and restrain the knee regions 36K of the occupant 36. Further, venting of the gas from the vent hole 16 is suppressed, so a drop in the internal pressure of the knee airbag 14 at the time of restraint of the knee regions 36K is suppressed and the reaction force of the knee airbag 14 with respect to the knee regions 36K is sufficiently ensured. Thus, the knee regions 36K of the occupant 36 can be restrained appropriately by the knee airbag 14.

In the present embodiment, a seat slide sensor is cited as one example of the detecting means, but the detecting means is not limited to this, and a camera or the like may also be used to detect the clearance between the glove box door 22 and the knee regions 36K of the occupant 36.

(Description of the Reference Signs)
10 Knee Airbag Device for a Vehicle
12 Front Passenger Seat (Vehicle Seat)
14 Knee Airbag
16 Vent Hole
18 Vehicle
20 Knee Airbag Device for a Vehicle
21 Glove Box
22 Glove Box Door (Storage Section)
34 Airbag Case
36 Occupant
36K Knee Regions
46 Through Hole
58 Actuator
60 Duct Portion
64 Strap

The invention claimed is:

1. A knee airbag device for a vehicle comprising:
a knee airbag that is normally stored in a folded state in a storage section and is configured to receive a supply of a gas at the time of a collision of the vehicle and inflate and deploy toward knee regions of an occupant seated in a vehicle seat; and
an airbag case that is disposed in the storage section, is configured to fold and store the knee airbag, has a through hole, has a side wall portion on a vehicle right side that is placed on the vehicle right side of a vehicle width direction center of the knee region on the vehicle right side, and has a side wall portion on a vehicle left side that is placed on the vehicle left side of a vehicle width direction center of the knee region on the vehicle left side; and
a vent hole that is disposed in the knee airbag, aligns with the through hole in the airbag case and to vent the gas to the outside when the knee regions are in a near state with respect to the storage section of the knee airbag, and, when the knee regions are not in the near state with respect to the storage section of the knee airbag, moves to the outside of the storage section in accompaniment with inflation and deployment of the knee airbag and is blocked at the time of restraint of the knee regions.

2. The knee airbag device for a vehicle of claim 1, wherein the vent hole is set in a position where it aligns with the through hole in the airbag case in a folded state of the knee airbag.

3. The knee airbag device for a vehicle of claim 1, wherein the vent hole is an elongated hole that is long in a vehicle front-rear direction.

4. The knee airbag device for a vehicle of claim 1, wherein the through hole is formed in the side wall portion of the airbag case.

5. The knee airbag device for a vehicle of claim 1, wherein the vent hole is configured such that it is pressed against and blocked by a surface on a vehicle rear side of the storage section.

6. The knee airbag device for a vehicle of claim 1, wherein the storage section is disposed inside a glove box door configuring an occupant-side outer wall of a glove box of the vehicle.

* * * * *